Patented Oct. 13, 1925.

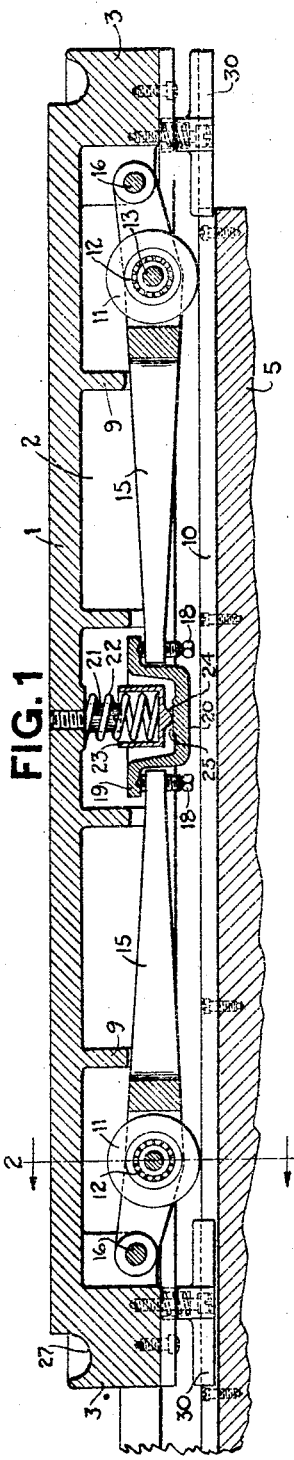

1,556,722

UNITED STATES PATENT OFFICE.

HOWARD B. SCOTT, OF DAYTON, OHIO, ASSIGNOR, BY MESNE ASSIGNMENTS, TO PRATT & WHITNEY COMPANY, OF HARTFORD, CONNECTICUT, A CORPORATION OF NEW JERSEY.

PROFILING MACHINE.

Application filed March 2, 1923. Serial No. 622,426.

*To all whom it may concern:*

Be it known that I, HOWARD B. SCOTT, a citizen of the United States, residing at Dayton, in the county of Montgomery and State of Ohio, have invented certain new and useful Improvements in Profiling Machines, of which I declare the following to be a full, clear, and exact description.

This invention relates to improvements in sliding tables for profiling, milling and other machines of that class, and has more particular relation to the means for making the operation of the same easier.

The principal object of the present invention is to provide a sliding table which is adapted to slide partly on milled or planed ways and partly on rollers, together with means for so adjusting the rollers that they will take any desired part of the load bearing upon the ways.

Another object of the present invention is to provide means whereby the load may be equalized between the various rollers aiding in supporting the table so that no one roller will be overloaded.

With these and incidental objects in view, the invention consists of certain novel features of construction and combinations of parts, the essential elements of which are set forth in appended claims and a preferred form of embodiment of which is hereinafter described with reference to the drawings which accompany and form part of this specification.

Of said figures:

Fig. 1 is a section taken through the sliding table on the line 1—1 of Fig. 2, looking in the direction of the arrows, and shows a portion of the stationary base cut away.

Fig. 2 is a sectional view taken on the line 2—2 of Fig. 1, looking in the direction of the arrows.

Fig. 3 is a detail top plan view of one of the levers which carries the supporting rollers.

Fig. 4 is a detail side elevation of the lever and rollers shown in Fig. 3.

Fig. 5 is a detail side elevation, partly in section, of the means for keeping the track upon which the rollers run free of any waste material.

Fig. 6 is a detail end elevation of the mechanism shown in Fig. 5.

In milling and profiling machines of large size the table upon which the work is placed together with the necessary fixture is so heavy that it has been found necessary to provide mechanism for relieving the load ordinarily carried by the ways on the stationary base of such machines. Supplementary means are provided for taking a part of this load on a plurality of ball bearing rollers. This invention provides four such rollers adapted to run on two horizontal tracks which are fastened to the stationary base. These rollers are so arranged that they may be adjusted to increase or decrease the amount of the load to be carried on the surfaced ways and on the rollers. Mechanism is also provided for equalizing the load on the various rollers, no matter what the adjustment of the parts may be, so that the table will always run smoothly and without any undue friction at certain points.

The patent to G. W. Smith, No. 991,100, issued May 2, 1911 shows a milling machine of the general type to which the present invention can be applied. It is evident, however, that the invention is applicable to any sort of a device having a weighty member which must be easily moved in predetermined directions and planes, and it is not desired to limit the present invention in any way to profiling or milling machines, as these machines simply form a convenient illustration of the usefulness of the invention.

The sliding table comprises a top 1, which is of suitable thickness to give the proper rigidity, and this top is provided with a downwardly extending longitudinal rib 2 running the full length of the table. On the sides and ends the table has downwardly extending portions 3. The side portions are milled or planed and are adapted to rest upon corresponding surfaces 4 of a stationary base 5 supported in any suitable manner. As can be seen from Fig. 2, the side members of the stationary base upon which the table is adapted to slide are formed with an inwardly extending flange 6 which co-operates with a plate 7 screwed to the underside of the table and thereby guides the table in its longitudinal movements. A slight clearance 8 between the flange 6 and the plate 7 is provided for purposes which will be later described. On the left hand side the table has a longitudinal groove cut therein into which a tapered member 35 fits which is fast to the stationary base, and which acts as a guide and aliner for the table.

Extending from the central rib 2 to both side members 3 of the table are a plurality of ribs 9 which lend strength and rigidity to the table.

On each side of the stationary base 5 is a longitudinally extending track 10 upon which a pair of rollers 11 are adapted to run. There is one of these rollers near the front and one near the back of the table on each side. Each of these rollers is supported by a ball bearing 12 which in turn is supported on a pin 13 extending between the arms 14 of a bifurcated lever 15. These levers are pivoted on rods 16 extending between the side portions 3 of the table and downwardly extending projections 17 of said table. At their opposite ends the levers 15 carry square-headed screws 18 which abut against flanges 19 of a cup 20. Projecting downwardly from the top of the table 1 is a screw stud 21 about which is a coiled spring 22. Surrounding the lower end of the spring 22 is a small cup 23, which, on its bottom, has a half-round projection 24 resting upon a surface 25 on the inside of the previously mentioned cup 20.

It can be seen from Fig. 1 that when the square-headed screws 18 are screwed upwardly they will raise the cups 20 and 23 against the tension of the spring 22 until the spring balances the table and any work that might be upon it, whereupon a continued movement of the screws 18 will slightly raise the table from the milled or planed surfaces 4 of the stationary base by means of the levers 15, with the rollers 11 acting as the fulcrum. Thus it can be seen that the mechanism is capable of any degree of adjustment from a point where the weight of the table is carried entirely on the milled or planed surfaces 4 of the stationary base to a point where the entire weight is carried by the rollers 11. This adjustment is possible due to the beforementioned clearance between the flanges 6 and plates 7 (Fig. 2).

It can be easily seen from Fig. 1 that should one of the screws 18 be given a greater adjustment than the other, the relative position of the two levers 15 would always remain the same, due to the compensating action of the two cups 20 and 23.

A gutter 27 is formed along all sides of the table top 1 for the purpose of catching oil and other waste material incident to the operation of the machine.

It is evident that should any metal chips or other material of a like nature get on the tracks 10 they would cause considerable trouble, as the table might be slightly raised or lowered thereby, changing the depth of the cut being made by the machine. To prevent this from occurring a wiper 30 is provided adjacent each of the rollers 11. These wipers are designed to brush any foreign material from the tracks. They consist of a U-shaped member which is adapted to partly surround the track 10. At its center the member 30 has an upwardly extending portion 31 which is countersunk to receive the heads of two screws 32. These screws extend into the lower side of the front and back portions 3 of the table (Fig. 1). A spring 33 surrounds each of the screws 32 and rests in a recess in the portion 31. A slight clearance is left between the portions 3 and 31 so that the wipers have a certain amount of flexibility in case they meet any obstruction.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, the combination of a sliding table, stationary ways upon which said table is adapted to be moved, and a plurality of rollers adapted to relieve said ways of a portion of the load and means to compensate the load taken by each of the rollers.

2. In a machine of the class described, the combination of a sliding table, stationary ways upon which said table is adapted to be moved, a plurality of rollers adapted to relieve said ways of a portion of the load, and means for adjusting said table so that said rollers will support any desired portion of the load.

3. In a machine of the class described, the combination of a sliding member, a stationary member, a plurality of levers pivoted to one of said members, ways on the other of said members on which said first mentioned member is adapted to be moved, and a plurality of rollers supported by said levers and adapted to relieve said ways of a portion of their load.

4. In a machine of the class described, the combination of a sliding table, a stationary base therefor, ways on said base on which said table is adapted to be moved, a plurality of levers pivoted to said table, and a plurality of rollers supported by said levers and adapted to relieve said ways of a portion of their load.

5. In a machine of the class described, the combination of a sliding table, a stationary base therefor, ways on said base on which said table is adapted to be moved, a plurality of levers pivoted to said table, a plurality of rollers supported by said levers, and means for so adjusting the said levers that said rollers will relieve said ways of any desired portion of their load.

6. In a machine of the class described, the combination of a sliding table, a stationary base therefor, a plurality of levers pivoted to said table, a plurality of rollers supported by said levers and adapted to partially support said table, and means cooperating with said levers for equalizing the weight carried by said rollers.

7. In a machine of the class described, the combination of a sliding table, a stationary base therefor, a plurality of levers pivoted to said table, a plurality of rollers supported by said levers and adapted to partially support said table, means for adjusting said levers to increase or decrease the weight carried by said rollers, and means cooperating with said levers for equalizing the weight carried by said rollers.

8. In a machine of the class described, the combination of a slidable table, a stationary base adapted to support said table, a plurality of pairs of bifurcated arms, said arms being pivoted to said table at opposite ends, rollers mounted in the bifurcated portions of said arms, a stud projecting from said table, a spring surrounding said stud, a cup enclosing the lower end of said spring and having a half-round projection thereon, a larger cup-shaped member in which said first mentioned cup rests and which has a flange about its rim, and a plurality of screws, one in the end of each of said levers, which are adapted to abut against the flange on said larger cup-shaped member and which by their adjustment will, through said levers, raise or lower the table as desired.

In testimony whereof I affix my signature.

HOWARD B. SCOTT.